No. 884,791. PATENTED APR. 14, 1908.
E. F. BAXTER.
JAR COVER.
APPLICATION FILED DEC. 13, 1906.
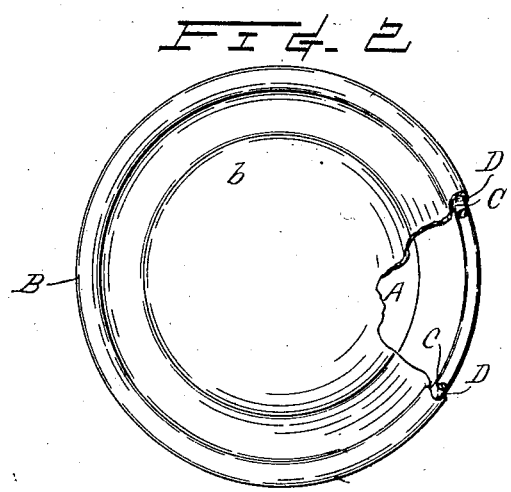
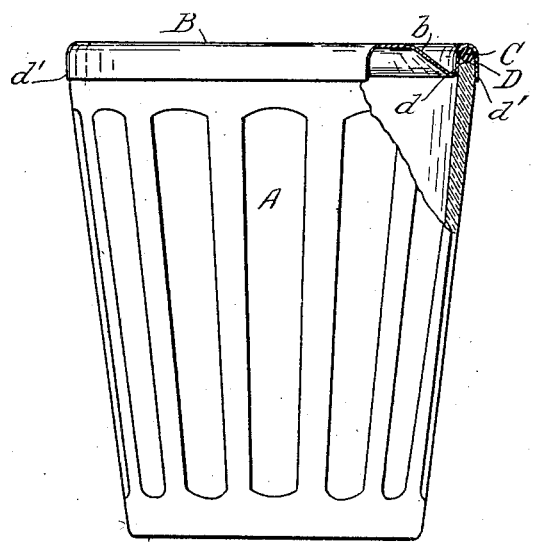
WITNESSES:
A. B. Brown
Horace Barnes.
INVENTOR
Edward F. Baxter
BY
Pierre Barnes
ATTORNEY

UNITED STATES PATENT OFFICE.

EDWARD F. BAXTER, OF SEATTLE, WASHINGTON.

JAR-COVER.

No. 884,791.

Specification of Letters Patent.

Patented April 14, 1908.

Application filed December 13, 1906. Serial No. 347,793.

*To all whom it may concern:*

Be it known that I, EDWARD F. BAXTER, citizen of the United States, residing at Seattle, in the county of King and State of Washington, have invented certain new and useful Improvements in Jar-Covers, of which the following is a specification, reference being had therein to the accompanying drawings, in which—

Figure 1 is an elevation of a jelly tumbler with an embodiment of my invention, one side of the figure being partially broken away and shown in section; and Fig. 2, a plan view of the same with portions of the cover and seal broken away.

The object of this invention is to produce a cover for jelly or preserved fruit container which is adapted to fit over the rim of a jar or tumbler mouth in such manner that the interposed flexible washer will be caused to register with said rim.

With these ends in view the invention consists in the novel construction and adaptation of a jar-cover, as will be hereinafter described and claimed.

In the drawings, the reference letter A represents a tumbler of ordinary construction; B, the cover; and C, a washer which upon being compressed between the cover and tumbler rim produces the seal. Said cover is desirably constructed of sheet metal which is stamped or otherwise formed to provide an annular groove D to receive said washer, and likewise have its peripheral walls *d* and *d'* protrude downwardly to overlap the receptacle rim as represented in Fig. 1. And to improve the strength and appearance of the cover the central web is pressed upwardly as at *b*. These covers are constructed of various sizes to fit vessels of various standard diameters, though they can readily be made to meet any special size made by the manufacturers, or the widths of the grooves may be such that they will accommodate vessels of odd sizes where the variation is not considerable.

The washer may be of any suitable shape in cross section though I find those made circular to be most satisfactory in practice. The cover as constructed reliably holds the washer in position while assembling without fastenings of any kind, and can be thus readily placed upon the tumbler or jar with the assurance that the washer will be presented against the container rim.

It may be said that the invention is especially intended for use upon containers which after being filled are sealed in a chamber from which the atmosphere has been exhausted and when removed therefrom the resultant vacuum within the container will prevent the withdrawal of the cover until air is admitted through an aperture in the cover.

The invention is extremely simple yet perfectly adapted to the purposes for which intended.

Having described my invention, what I claim as new and desire to secure by Letters-Patent, is—

A cover for vessels composed of a flat horizontal circular portion of metal provided with a comparatively short annular downwardly inclined portion which extends at an obtuse angle to said circular portion, an annular upwardly extending portion vertically straight and integral with said inclined portion and disposed at an acute angle thereto, a second annular vertically straight portion of slightly greater length than said first named vertically straight portion spaced from the latter and having its lower end extending but slightly below the juncture of said inclined portion and said first named vertically straight portion, a semi circular portion integral with said vertically straight portions and connecting the same, the highest point of said semi circular portion being in the same plane as said flat horizontal circular portion, and a rigidly secured washer circular in cross section sealing directly in and impinging against said semi circular portion and the uppermost portions of said vertically straight portions.

In testimony whereof I affix my signature in presence of two witnesses.

EDWARD F. BAXTER.

Witnesses:
 PIERRE BARNES,
 JOSEPH RISSE.